US011488082B2

(12) United States Patent
Benani et al.

(10) Patent No.: US 11,488,082 B2
(45) Date of Patent: Nov. 1, 2022

(54) MONITORING AND VERIFICATION SYSTEM FOR END-TO-END DISTRIBUTION OF MESSAGES

(71) Applicant: salesforce.com, inc., San Francisco, CA (US)

(72) Inventors: Utsavi Benani, Fremont, CA (US); Zhidong Ke, Milpitas, CA (US); Scott W. Bishel, Erie, CO (US); Praveen Innamuri, Sunnyvale, CA (US); Kevin Terusaki, Oakland, CA (US); Shan-Cheng Ho, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 260 days.

(21) Appl. No.: 16/366,922

(22) Filed: Mar. 27, 2019

(65) Prior Publication Data

US 2020/0311637 A1 Oct. 1, 2020

(51) Int. Cl.
*G06Q 10/06* (2012.01)
*G06F 9/54* (2006.01)
*G06F 16/908* (2019.01)
*G06F 16/17* (2019.01)
*G06Q 30/00* (2012.01)
*G06F 9/50* (2006.01)

(52) U.S. Cl.
CPC ....... *G06Q 10/06315* (2013.01); *G06F 9/546* (2013.01); *G06F 16/1734* (2019.01); *G06F 16/908* (2019.01); *G06F 9/5016* (2013.01); *G06Q 30/016* (2013.01)

(58) Field of Classification Search
CPC ....... G06F 16/908; G06F 9/546; G06F 16/903
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |

(Continued)

*Primary Examiner* — Ashish Thomas
*Assistant Examiner* — Jedidiah P Ferrer
(74) *Attorney, Agent, or Firm* — Dergosits & Noah LLP; Todd A. Noah

(57) ABSTRACT

Described is a method and system for verifying the end-to-end distribution of messages within an on-demand services platform. To provide the ability to monitor and trace such messages, the system may include a specialized and queryable datastore (or database) that allows the system to track the distribution and acknowledgement of messages throughout the services platform. Accordingly, a specialized verification process may be initiated to query the database to verify the receipt of a message has been acknowledged by various components within the system. In addition, the verification process may automatically retry the distribution the messages to ensure particular downstream components have received the message. Accordingly, the system alleviates the need to manual re-crawl various message source to ensure the end-to-end distribution of such messages.

15 Claims, 7 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,143,128 B1 * | 11/2006 | Baweja ................ G06F 9/5027 709/201 |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0204275 A1 * | 8/2007 | Alshab ................... G06F 9/546 719/313 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0060800 A1 * | 3/2011 | Cohen ................. G06Q 10/107 709/206 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0019480 A1 * | 1/2015 | Maquaire ................ G06F 16/23 707/609 |
| 2015/0095162 A1 | 4/2015 | Jakobson et al. |
| 2015/0172563 A1 | 6/2015 | Jakobson et al. |
| 2016/0094383 A1 * | 3/2016 | Wang ................... G06F 16/951 709/221 |
| 2016/0307286 A1 * | 10/2016 | Miasnik ............... G06Q 50/265 |

* cited by examiner

MONITORING AND VERIFICATION SYSTEM FOR END-TO-END DISTRIBUTION OF MESSAGES

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This disclosure relates to distributing data within a system, and more particularly, monitoring the distribution of messages within an on-demand services platform.

BACKGROUND

Various on-demand (or cloud-based) customer relationship management (CRM) software tools exist to aid organizations with managing interactions with customers and potential customers. These tools, however, rely on vast amounts of data that often results in unique data processing challenges. For example, managing such large amounts of data (e.g. millions of records from thousands of customers) requires efficient mechanisms for managing and tracking the distribution of such data. Moreover, the management of data becomes increasingly complex and resource intensive when disseminated the data across a distributed set of computing resources. Although various management tools exist to aid with the management of data across a distributed system, these tools are often ill-suited for tracing and verifying data distribution from a data source to various independent downstream software components that may be part of an on-demand services platform. As a result, there is a continued need for tools to efficiently manage end-to-end data distribution within an on-demand services platform.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
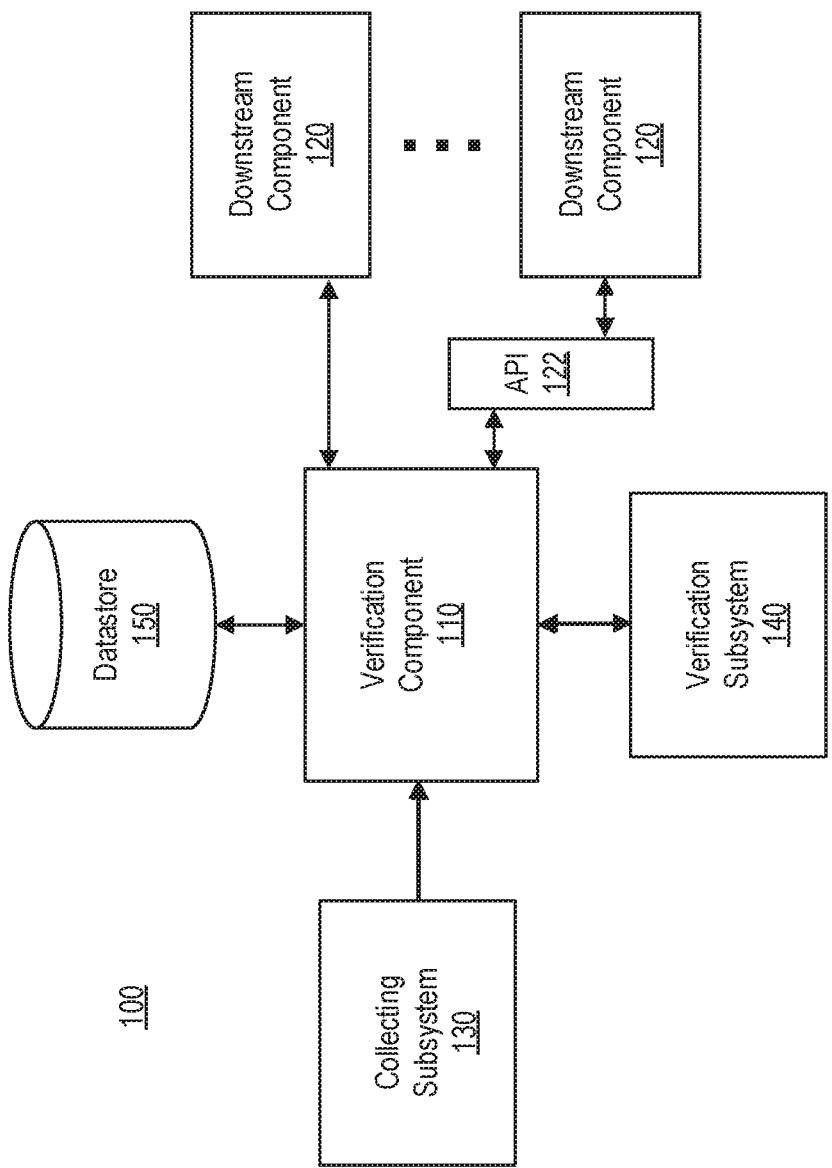
FIG. 1 is a block diagram illustrating an example high-level overview of an operating environment for tracing and verifying the distribution of messages within a system according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for verifying the end-to-end distribution of messages within an on-demand services platform. For example, the end-to-end distribution may include crawling various third-party message services (e.g. email and calendar servers) and forwarding these messages to various downstream components throughout the services platform. These components may then integrate information from these messages (e.g. emails or calendar appointments) to provide various tools (e.g. sales and marketing tools). To provide the ability to monitor and trace such messages, the system may include a specialized and queryable datastore (or database) that allows the system to track the distribution and acknowledgement of messages throughout the services platform. For example, the queryable datastore may create specialized entries for each message retrieved from a source (e.g. third-party messaging service) to store information related to the distribution status of each message. Accordingly, a specialized verification process may be initiated to query the database to verify the receipt of a message has been acknowledged by various components within the system. In some embodiments, the verification process may automatically retry distribution to ensure particular downstream components have received the message. Accordingly, the system alleviates the need to manually re-crawl various message sources to ensure the end-to-end distribution of messages.

In some embodiments, the verification process may leverage various computing resources such as cluster computing frameworks. For example, the verification and redistribution of messages may be performed by a set of jobs (or sub-jobs) by a set of distributed computing resources. The verification components may use a cluster computing framework (or platform), which may include, for example, the Apache Spark framework, although other frameworks are also contemplated. In addition, to minimize the additional resource overhead required to perform such a verification process, the system may compartmentalize or associate messages into efficient storage containers (e.g. buckets). For example, upon a verification of a set of messages associated with one or more storage containers, the system may maintain a checkpoint (e.g. timestamp) to limit the verification and redistribution of data to an efficient (e.g. optimal or near optimal) number of messages.

Accordingly, the configuration of the system provides various features that were not otherwise available in previous data management systems. For example, the system provides for the creation of specialized entries within a datastore that provides the ability to trace messages throughout the system in a scalable manner. Accordingly, such a configuration allows components to efficiently obtain status updates on a per-message-basis that allows for the automatic redistribution of messages throughout the system. Thus, in some embodiments, described is an efficient mechanism for monitoring and verifying the end-to-end distribution of messages within an on-demand services platform.

FIG. 1 is a block diagram illustrating an example high-level overview of an operating environment 100 for tracing and verifying the distribution of messages within a system according to one or more embodiments of the disclosure. In some embodiments, the environment (or system) 100 may be part of, or work in conjunction with, an on-demand database services system (or on-demand services platform) as further described herein.

The environment 100 may include a verification component 110, one or more downstream components 120, collecting subsystem (or system) 130, verification subsystem (or system) 140, and a datastore 150. These components may interact via a network, which may be any type of wired or wireless network including a local area network (LAN), a wide area network (WAN), or a direct communication link, or other suitable connection.

The verification component (or module) 110 may provide specialized functionality to provide a mechanism to trace and verify messages throughout and end-to-end distribution. For example, the end-to-end distribution may include retrieving messages from a messaging service (e.g. third-party messaging servers) by a collecting subsystem 130 and distributing them to one or more downstream components 120 of an on demand services platform. The collecting subsystem 130 may retrieve (fetch, obtain, etc.) messages from various sources including third-party messaging services (or servers).

As referred to herein, messages are broadly defined to include various types of content items from which information may be extracted and utilized by various components of an on-demand services platform. For example, in some embodiments, the messages may include email messages, text messages, calendar appointments, reminders, notifications, etc. Messages, however, may also include content items that may be accumulated over time and may be associated with particular customers or users. For example, documents, media, and other files types are also contemplated as data that may be verified as part of an end-to-end distribution as described herein.

The downstream components (or modules) 120 may include various productivity tools provided by a service provider (e.g. on-demand database services provider). For example, the productivity tools may include various components that may be used, for example, as part of a marketing or sales platform. For example, the marketing platform may obtain data (e.g. messages) and perform various marketing tasks or analysis. In addition, such productivity tools may include machine learning components that use (e.g. input) such data to improve software functionality. In some embodiments, downstream components 120 may interact with the verification of 110 (and other components) via an application programming interface (API) 122.

The datastore (or database) 150 may be any suitable database to data structure for storing information. In some embodiments, the datastore 150 may be implemented using a system (or framework) to provide scalability and fault-tolerance within a cloud-based infrastructure. For example, the datastore may be part of a NoSQL database management system, which may include, for example, the Apache Cassandra database system, although other database configurations (e.g. a relational database) and systems are also contemplated.

Figure 2:
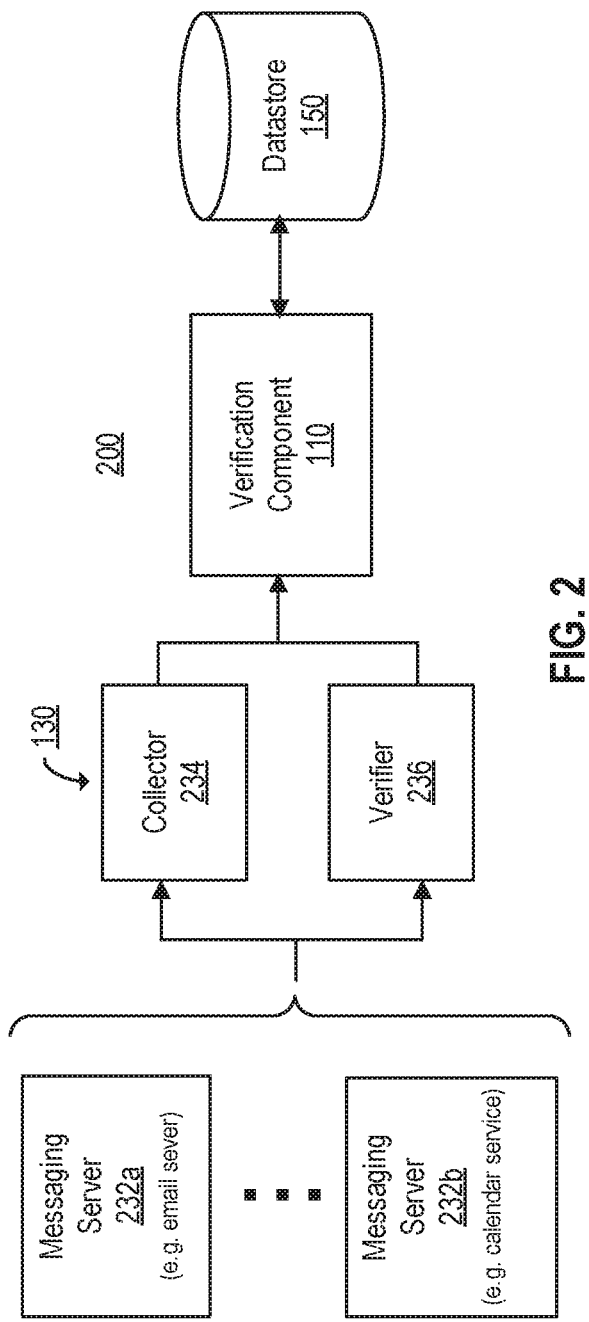
FIG. 2 is a block diagram illustrating an example overview of an interaction between components to retrieve messages for distribution according to one or more embodiments of the disclosure.

As described, the end-to-end distribution may include retrieving messages from a data source by components of the system as shown in FIG. 2.

FIG. 2 is a block diagram illustrating an example overview 200 of an interaction between components to retrieve messages for distribution according to one or more embodiments of the disclosure. As shown, the collecting subsystem 130 may include a collector 234 and a verifier 236. The collector 234 may retrieve messages (and other types of data) from one or more messaging servers 232, which may be associated with various types of services that provide various types of messages. In addition, these messaging servers 232 may be provided by third-party services. For example, the messaging servers may include an email server (e.g. a messaging server 232a) as well as other types of servers such as a calendar service (e.g. messaging server 232b). In some embodiments, each messaging server 232 may be associated with a datasource identifier (or ID). The collector 234 may retrieve (or fetch, crawl, obtain, etc.) messages from the one or more messaging servers 232. A verifier 236 may verify information associated with the retrieval of messages, and in some embodiments, provide information for a verification process as further described herein. The verifier, as part of the connector framework, ensures that the collector processed all messages it should have for a given time period. It will retrieve and process any messages not handled by the collector.

In some embodiments, messages may be retrieved using an API or protocol a third-party service provides for allowing the secure retrieval of messages. In some embodiments, these retrieved messages may then be stored within (or associated with) one or more storage containers.

In some embodiments, the storage containers may include buckets (or storage buckets). Due to the potentially large number of messages that may be associated with a particular user (or customer), messages may be retrieved periodically (based on a schedule) to manage resources. For example, depending on the potential number of messages, the collector 234 may be retrieved messages at 10 minute intervals. Accordingly, the messages retrieved at a particular interval may be stored in a particular set of buckets that are associated with the particular interval. In some embodiments, a message may be associated with a particular storage container based on a timestamp. Upon retrieving a message, a new entry may be created within the datastore 150 to trace (or monitor, track, manage, etc.) the messages throughout the distribution process. The entry in the datastore 150 (e.g. record) may include various types of information (e.g. data fields) to provide such a tracing capability. In some embodiments, the entries may be stored as part of a verification table managed by the datastore 150. For example, the following schema may be used to create a verification table:

```
CREATE TABLE verification (
    bucket timestamp,
    datasource text,
    externalID text,
    itemID text,
    crawlTime timestamp,
    priority int,
    timeline boolean,
    onesync boolean,
    retry int,
    crawlType text,
    PRIMARY KEY ((bucket), datasource, crawlTime, enteralID))
WITH CLUSTERING ORDER BY (datasource DESC, crawlTime DESC,
externalID DESC
```

Accordingly, when a message is retrieved, the verification component 110 may create the new entry (or update an existing entry) of the verification table for tracing the subsequent distribution (or dissemination, transmission, sharing, etc.) of the message to various other downstream components (e.g. downstream component 120). The datastore 150 may indicate downstream components to which a message has been distributed, and in addition, which downstream components have acknowledged receipt of a message. In some embodiments, the downstream components may acknowledge receipt directly by updating the datastore 150, or the verification component 110 may update the datastore 150 upon receiving an indication a downstream component has successfully received a message. For example, an acknowledgment of the message may be submitted using various commands (e.g. POST command) or updates. For example, a schema for an acknowledgement message may include information (e.g. payload) corresponding to fields of the verification table such as a datasource (e.g. datasource ID), externalID, crawlTime, and a component identifier, which identifies the particular downstream component acknowledging receipt of the message. The datastore 150 stores the verification table, which includes an ID that allows the verification component 110 to retrieve the message from the original source. The datastore 150 may then be utilized by the system (e.g. verification component 110) to initiate a verification process to ensure particular downstream components have received the message as shown in FIG. 3.

Figure 3:
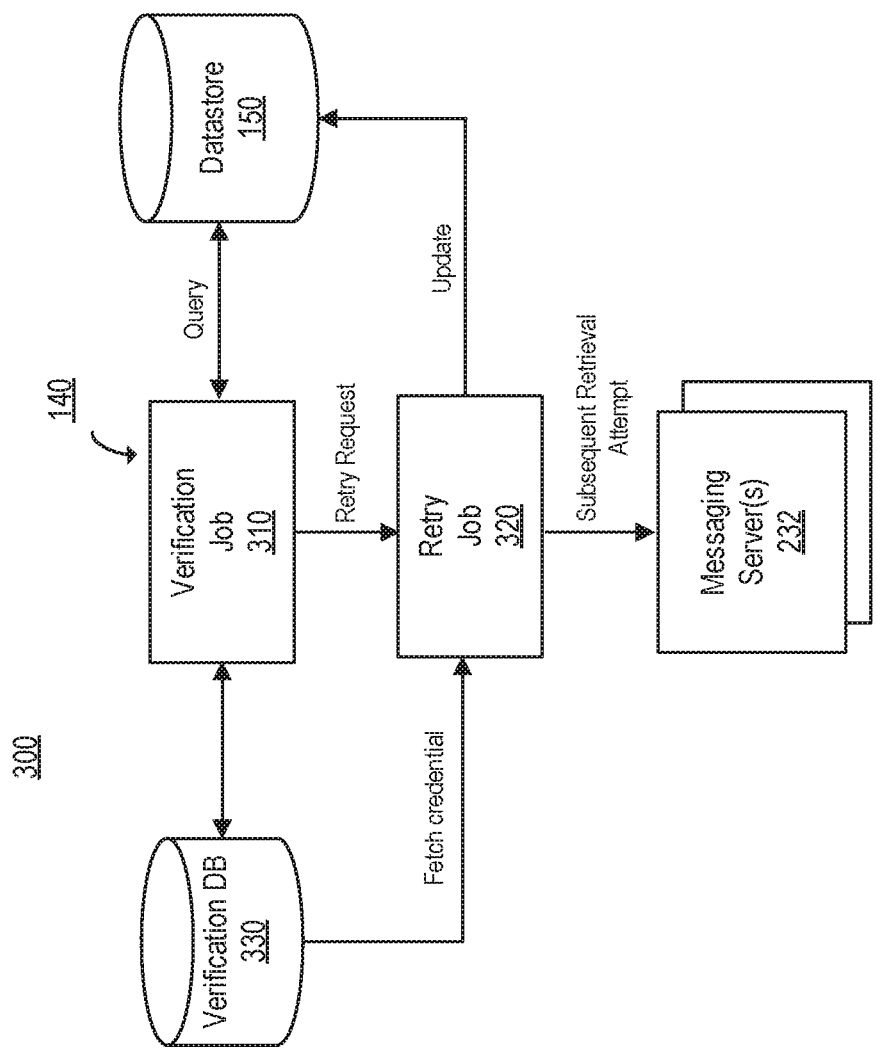
FIG. 3 is a block diagram illustrating an example overview of an interaction between components during a verification process according to one or more embodiments of the disclosure.

FIG. 3 is a block diagram illustrating an example overview 300 of an interaction between components during a verification process according to one or more embodiments of the disclosure.

As shown, the verification subsystem 140 may include initiating various verification jobs. For example, the verification component 110 may request to verify whether a certain set of messages (e.g. messages associated with particular buckets) have been received by various downstream components. Upon receiving a request to initiate a verification process, the verification job 310 may query the datastore 150 to determine which downstream components have acknowledged receipt of a particular set of messages. For example, the verification job 310 may query the datastore 150 to obtain information for entries stored in the verification table that are associated with the particular set of messages. When querying the datastore 150, and efficient query may be performed by limiting the query to only those storage containers (e.g. buckets) associated with messages that have not yet been verified. For example, the verification process may be executed periodically (e.g. as per a schedule), and accordingly, only messages retrieved since the last performed verification process may need to be queried. In some embodiments, in order to keep track of messages that have been verified, the system may store checkpoints in a verification database 330. For example, the checkpoints may correspond to timestamps associated with messages or storage containers of messages that were included in a previous verification process. Accordingly, the system may retrieve the most recent checkpoint, and only perform a verification of messages retrieved subsequent to the last recorded checkpoint (e.g. timestamp). Based on the query, the verification job 310 may determine which messages were not received by particular downstream components (e.g. messages for which an acknowledgment was not received). Accordingly, after performing a query, a retry job 320 may attempt a subsequent retrieval of messages that were not received by one or more downstream components. In some embodiments, the retry job 320 may attempt to retrieve messages from the messaging server 232. Alternatively, messages may be stored within the system, and accordingly, may be retrieved from a local data source. As part of the retrieval process, the retry job 320 may be required to obtain the necessary credentials from the verification database 330 to access a third-party service. For example, the verification database 330 may store the required credentials (e.g. username and password, key, certificate, etc.) in a secure manner. Upon retrieving such messages, the retry job 320 may then correspondingly update the datastore 150. The verification component 110 may then distribute the messages to downstream components as described above.

As described, the verification process may be performed by a set of jobs that execute on a distributed set of computing resources (e.g. a cluster of nodes). Accordingly, multiple verification processes may be performed in parallel to improve overall performance. In some embodiments, in order to efficiently process messages, the system may bucket messages into customized (e.g. optimal) sizes. For example, the bucket sizes may provide an optimal (or near optimal) amount of data to be processed by each job, for example, to improve performance. In addition, the system may provide further efficiencies by implementing distributed message verification. For example, by breaking up the message verification process into discrete sub-jobs, the system can increase parallelism by executing multiple sub-jobs at once.

Figure 4:
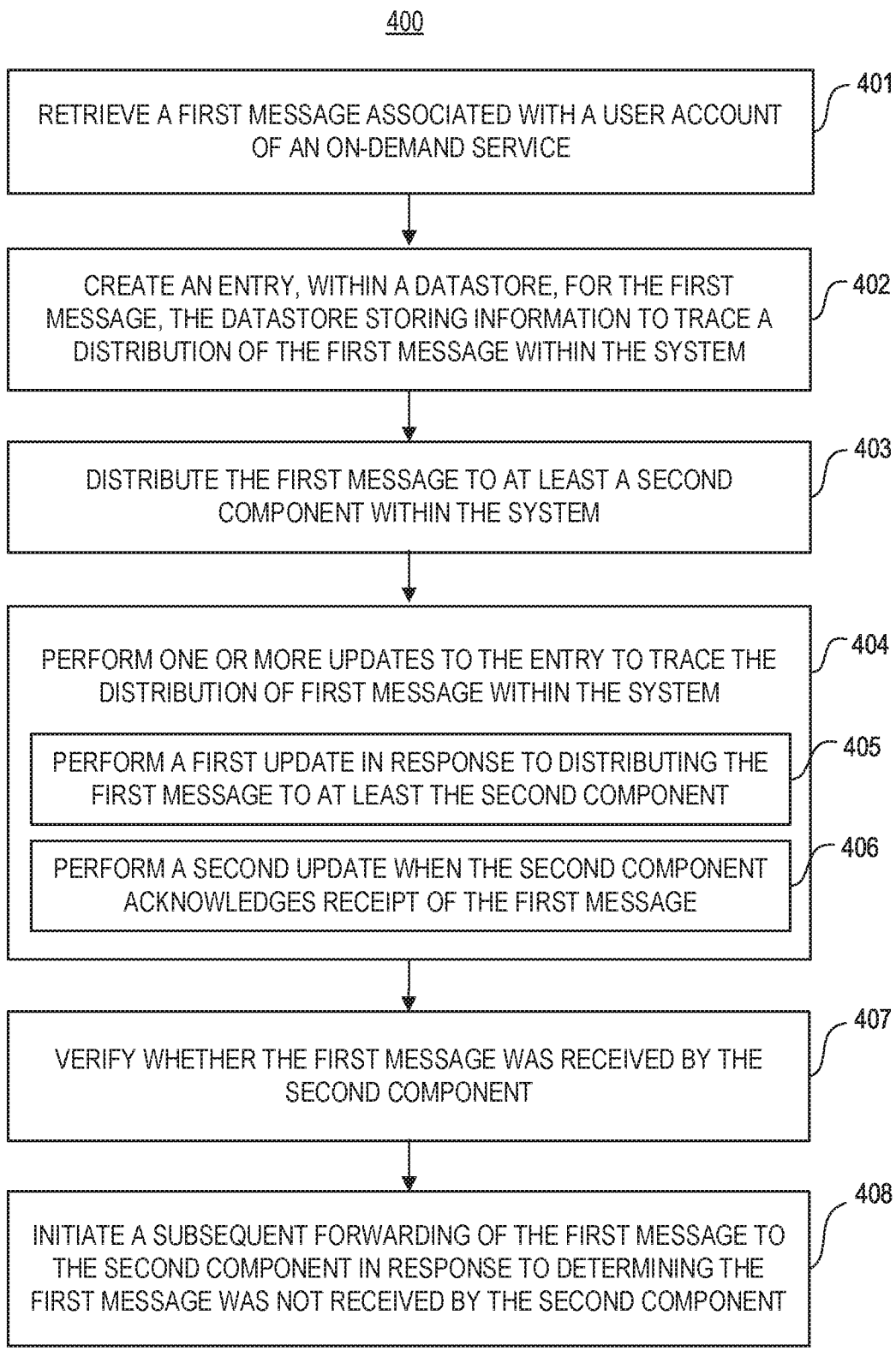
FIG. 4 is a process flow diagram illustrating an example method of verifying messages distributed within a system according to one or more embodiments of the disclosure.

FIG. 4 is a process flow diagram 400 illustrating an example method of verifying messages distributed within a system according to one or more embodiments of the disclosure. Process 400 may use processing logic, which may include software, hardware, or a combination thereof. For example, process 400 may be performed by a system including one or more components described in the operating environment 100.

In 401, the system may retrieve a first message associated with a user account of an on-demand service. As described the system may be part of an on-demand services platform (or on-demand database service). In one embodiment, the first message may be retrieved from a messaging service (e.g. messaging server 232), which may include a third-party messaging service. In one embodiment, the retrieval may be performed by a first component within the system (e.g. verification component 110) by accessing a third-party messaging server. The retrieval (or crawling, fetching, etc.) of the message from the messaging service may be part of a scheduled routine to retrieve messages associated with a user account of the on-demand service (or services platform). For example, a user account (or customer) of the on-demand service may have an account with a third-party service (e.g. third-party email and/or calendar service). Accordingly, a component may crawl an email server or calendar server to retrieve such messages and integrate information from these messages into various tools provided by the platform. For example, information from an email may be incorporated into various email marketing tools provided by the on-demand services platform. As another example, meeting appointments from a calendar appointment can be incorporated into an automated scheduling tool. In yet another example, information from messages may be ingested by various machine learning components In 402, the system may create an entry, within a datastore, for the first message. In one embodiment, the datastore (e.g. datastore 150) may store information to trace a distribution of the first message within the system. In one embodiment, the system may create the entry in response to retrieving the message. For example, a new entry may be created for each message retrieved. The entry may include various types of information (e.g. data fields) that may be associated with a message. In one embodiment, the entry may update a verification table as described above.

In 403, the system may distribute the first message to at least a second component (e.g. downstream component 120) within the system. In one embodiment, the second component (e.g. a productivity tool), which may be different than the first component, may extract information from the first message to provide the on-demand service. For example, the second component may extract details from an email message for various sales and marketing tools. As another example, the second component my extract meeting details from a calendar appointment and integrate such information into various tools.

As described, the system may track the distribution of messages within the on-demand services platform. For example, the configuration of the system may allow monitoring (or tracking, tracing, etc.) of the status of messages throughout the system. Such a functionality may be provided in part by the system maintaining a queryable datastore.

Accordingly, in 404, the system may perform one or more updates to the entry within the datastore to trace the distribution of first message within the system. The one or more updates may include performing a first update in response to distributing the first message to at least the second component in 405. In addition, the one or more updates may include performing a second update when the second component acknowledges receipt of the first message in 406. For example, the second component may transmit an acknowledgment (e.g. message) as described above to the verification component confirming the first message has been successfully received.

As described, the system may periodically (e.g. as per a schedule) determine a current status of one or more messages.

Accordingly, in 407, the system may verify whether the first message was received by the second component. In one embodiment, the verifying may be performed by querying the datastore. For example, the system may determine whether the second update was performed in response to the second component acknowledging receipt of the first message. For example, the system may query the datastore to determine all of the messages that were not delivered to various components. In one embodiment, the query may be part of a plurality of queries (e.g. on an as-needed basis) to the datastore to determine a current status of the message. In one embodiment, the system may query the datastore to determine whether the second component acknowledged receipt of the message. Because the system maintains a datastore the system may obtain any information available from a query. For example, various components may initiate a query to obtain information of a data set (e.g. total number of messages, average size, etc.), as well obtain information regarding individual messages such as the current status (e.g. forwarded, acknowledged, etc.). In addition, due to the potential of storing of a large number of messages (or data) per customer, the messages may be organized in various buckets. In one embodiment, the buckets may correspond to a time interval of messages retrieved from a source. Depending on the number of potential messages, the time interval may be several minutes to several hours. In one embodiment, the system may perform an estimation regarding the number of messages potentially retrieved during a time interval and set the interval accordingly. For example, the system may aim for a data set to be an optimal (or near optimal) size for searching based on balancing the resources required to perform processing versus the data storage overhead.

Accordingly, in some embodiments, the system may identify a previous verification timestamp associated with a storage container for messages included as part of a most recently performed verification, and accordingly, identify one or more storage containers for messages retrieved since the previous verification timestamp. Thus, the system may query only entries of the datastore associated with the one or more storage containers to determine whether the second component acknowledged receipt of the first message. In addition, in some embodiments, the system may set a current verification timestamp associated with the one or more storage containers in response to verifying whether the first message was received by the second component.

In 408, the system may initiate a subsequent forwarding of the first message to the second component. In one embodiment, the system may perform the subsequent forwarding automatically in response to determining the first message was not received by the second component. For example, the system may initiate a subsequent forwarding of the message to the second component in response to determining the second component failed to acknowledged receipt of the message. In one embodiment, the system may retrieve the message from the third-party messaging service at least a second time and forward the message to the second component. Accordingly, the system attempts to retry the retrieval and forwarding process. In addition, in some embodiments, the system may initiate the subsequent forwarding of the message automatically (e.g. without user intervention). In some embodiments, the system may determine the message is stored locally (e.g. within a datastore of the on-demand services platform) and forward the message directly to the second component. However, in some embodiments, the system may be required to retrieve (e.g. recrawl, scan, etc.) the third-party messaging service.

As part of the retrieval process, the system may be required to obtain the necessary credentials for accessing the third-party service. For example, the system may store the required credentials (e.g. username and password, key, certificate, etc.) in a secure data source. In some embodiment, the third-party service may be provided secure access to message using an API.

Thus, the system may verify the receipt of a message, and if necessary, may automatically retry the distribution of a message to ensure particular downstream components have received the message. Accordingly, the system alleviates the need to manual re-crawl various message sources to ensure the end-to-end distribution of such messages. Accordingly, in some embodiments, described is an efficient mechanism for monitoring and automatically redistributing messages within an on-demand services platform.

In some embodiments of the disclosure, the components as described above may be used in conjunction with an on-demand database service.

Figure 5:
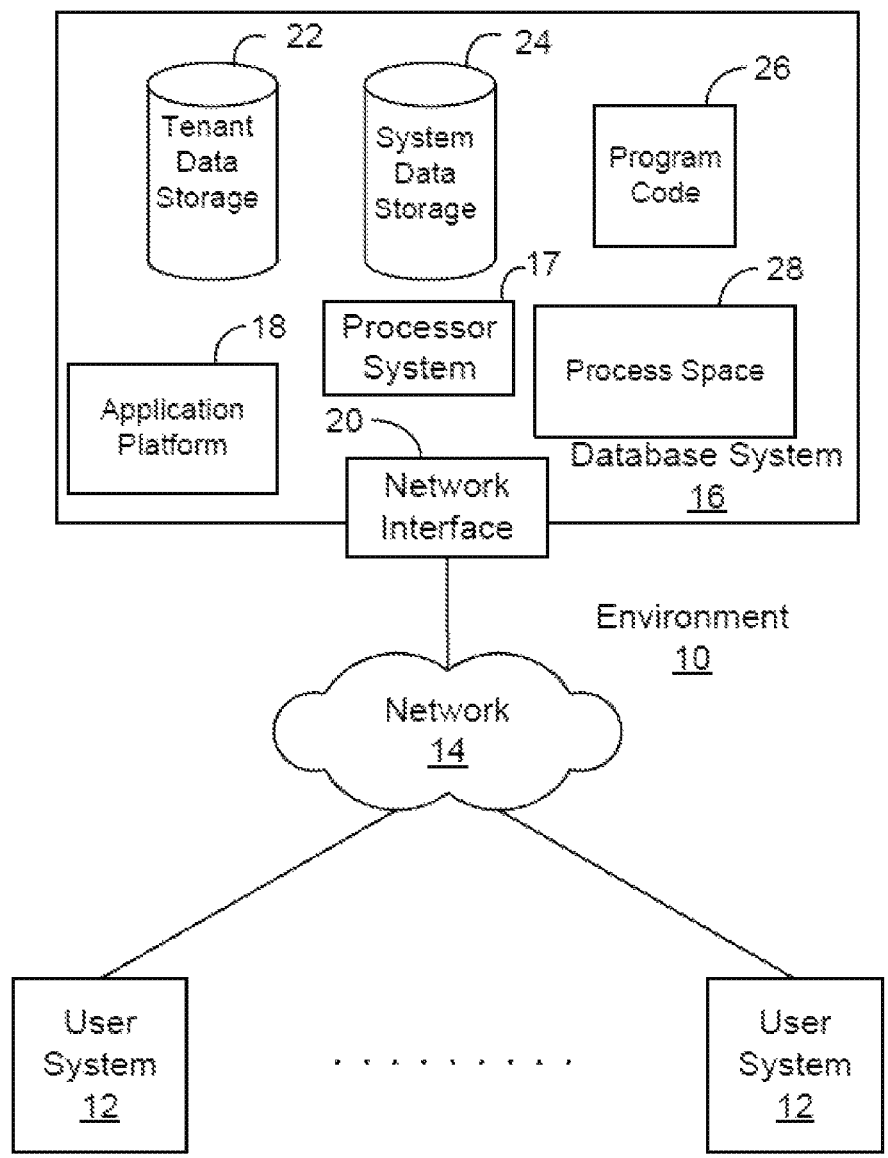
FIG. 5 is a block diagram illustrating an example environment in which on-demand database services may be used in conjunction with one or more embodiments of the disclosure.

FIG. 5 is a block diagram illustrating of an example environment 10 in which on-demand database services may be provided to be used in conjunction with one or more embodiments of the disclosure.

Environment 10 may include user systems 12, network 14, database system 16, processor system 17, application platform 18, network interface 20, tenant data storage (or data store) 22, system data storage (or data store) 24, program code 26, and process space 28. In other embodiments, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As shown, user systems 12 might interact via a network 14 with an on-demand database service, which is implemented, in this example, as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some embodiments, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some embodiments, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one embodiment, system 16 may implement a web-based CRM system. For example, in one embodiment, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third-party developer) applications, which may or may not include CRM, may be supported by the application platform 18, which manages creation, storage of the applications into one or more database objects and executing of the applications in a virtual machine in the process space of the system 16.

In one embodiment, an arrangement for elements of system 16 may include a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in this example include conventional, well-known elements that are explained only briefly here. For example, each user system 12 could include a personal computer, server, smart phone, or any wireless access protocol (WAP) enabled device or any other computing device capable of interfacing directly or indirectly to the Internet or other network connection. User system 12 may run an HTTP client, e.g., a browsing program or "browser", or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such a smart watch or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one embodiment, each user system 12 and all of its components are operator configurable using applications, such as a browser. Similarly, system 16 (and additional instances of an MTS, where more than one is present) and all of its components might be operator configurable using applications using processor system 17, which include one or more processors. Non-transitory computer-readable media as further described herein can have instructions stored thereon/in, that can be executed by or used to program a computing device to perform any of the methods of the embodiments described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or any other type of computer-readable medium or device suitable for storing instructions and/or data. Additionally, the entire program code, or portions thereof, may be transmitted and downloaded from a source over a network connection. It will also be appreciated that computer code for the disclosed embodiments can be realized in any programming language that can be executed on a client system and/or server or server system such as, for example, C, C++, HTML, any other markup language, Java, JavaScript, ActiveX, any other scripting language, such as VBScript, and many other programming languages as are well known may be used.

According to some embodiments, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6:
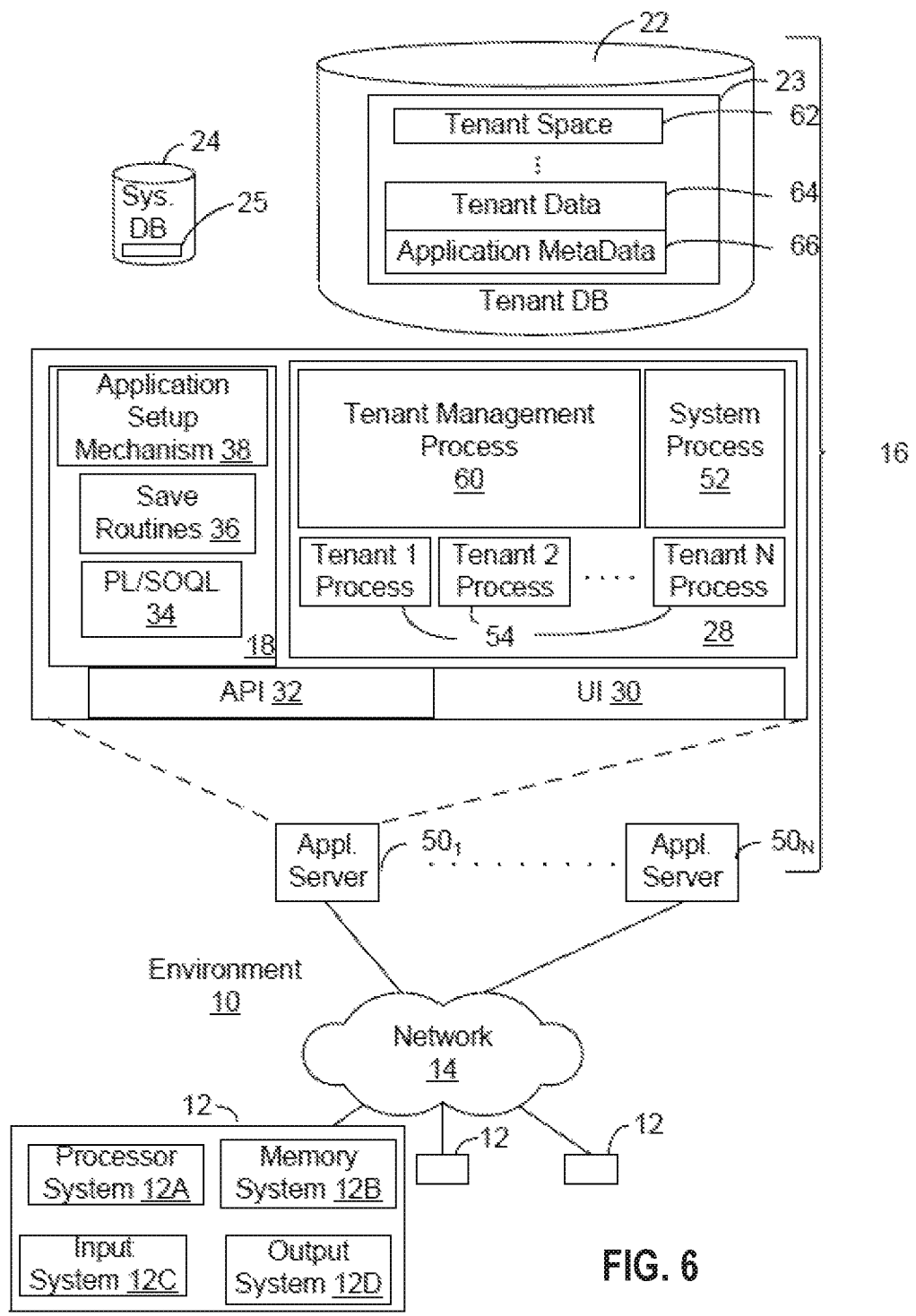
FIG. 6 is a block diagram illustrating an example of elements of FIG. 5 and various possible interconnections between these elements according to one or more embodiments of the disclosure.

FIG. 6 is a block diagram illustrating an of example of elements of FIG. 5 and various possible interconnections between these elements according to one or more embodiments of the disclosure.

As shown, elements of system 16 and various interconnections in some embodiments are further illustrated. As shown, in one embodiment, the user system 12 may include processor system 12A, memory system 12B, input system 12C, and output system 12D. This example shows network 14 and system 16, and also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers 501-50N, system process space 52, tenant process spaces 54, tenant management process space 60, tenant storage space 62, user storage 64, and application metadata 66. In other embodiments, environment 10 may not have the same elements as those listed above and/or may have other elements instead of, or in addition to, those listed above.

Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown in this example, system 16 may include a network interface 20 implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® or HBase databases.

Figure 7:
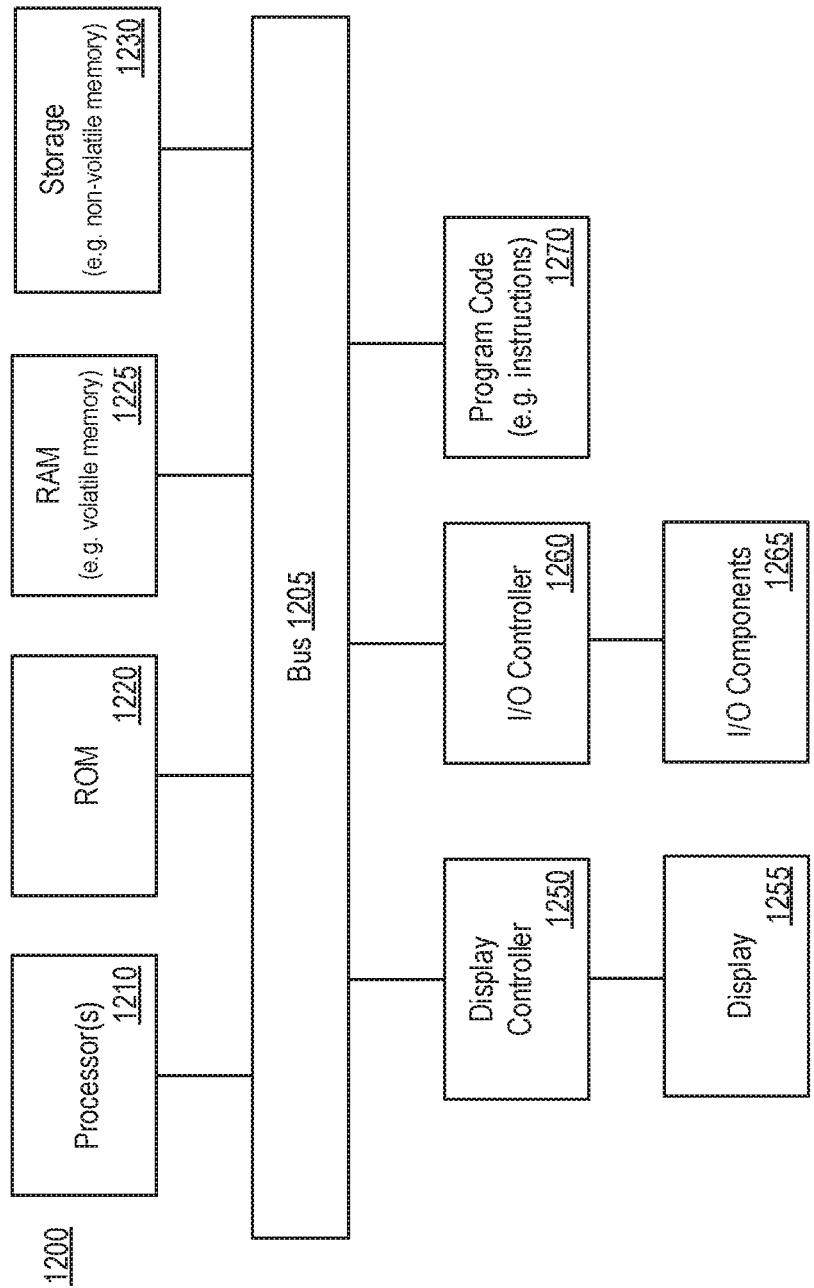
FIG. 7 is a block diagram illustrating an example of a computing system that may be used in conjunction with one or more embodiments of the disclosure.

FIG. 7 shows a block diagram of an example of a computing system that may be used in conjunction with one or more embodiments of the disclosure. For example, computing system 1200 (or system, or server, or computing device, or device) may represent any of the devices or systems (e.g. system 160, system 16, automation building tool 191, etc.) described herein that perform any of the processes, operations, or methods of the disclosure. As referred to herein, a system, for example, with reference to the claims, may include one or more computing systems that may include one or more processors. Note that while the computing system 1200 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor(s) 1210, ROM (Read Only Memory) 1220, RAM (or volatile memory) 1225, and storage (or non-volatile memory) 1230. The processor (or processors) 1210 may retrieve stored instructions from one or more of the memories 1220, 1225, and 1230 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein. As referred to herein, for example, with reference to the claims, a processor may include one or more processors. Moreover, the one or more processors 1210 may perform operations in a "cloud computing" environment or as a service (e.g. within a "software as a service" (SaaS) implementation). Accordingly, the performance of operations may be distributed among the one or more processors 1210, whether residing only within a single machine or deployed across a number of machines. For example, the one or more processors 1210 may be located in a single geographic location (e.g. within a home environment, an office environment, or a server farm), or may be distributed across a number of geographic locations.

The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Program code 1270 may represent any of the instructions, applications, software, libraries, toolkits, modules, components, engines, units, functions, logic, etc. as described herein. Program code 1270 may reside, completely or at least partially, within the memories described herein (e.g. non-transitory computer-readable media), or within a processor during execution thereof by the computing system. Program code 1270 may include both machine code, such as produced by a compiler, and files containing higher-level or intermediate code that may be executed by a computing system or other data processing apparatus (or machine) using an interpreter. In addition, program code 1270 can be implemented as software, firmware, or functional circuitry within the computing system, or as combinations thereof. Program code 1270 may also be downloaded, in whole or in part, through the use of a software development kit or toolkit that enables the creation and embodiment of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:
1. A system comprising:
one or more processors; and
a non-transitory computer readable medium storing a plurality of instructions, which when executed, cause the one or more processors to:
retrieve proactively from a third-party messaging service and by a retrieval component of the system, a message associated with a user account that is subscribed to an on-demand service;

create an entry for the message within a datastore, the datastore storing information to trace a distribution of the message within the system;

distribute the message to at least an extraction component within the system, the extraction component extracting information from the message, the extracted information being provided to a productivity tool within the on-demand system;

perform one or more updates to the entry to trace the distribution of the message, the one or more updates including a message distribution update in response to distributing the message to at least the extraction component, and a message receipt update when the extraction component acknowledges receipt of the message;

verify whether the message was received by the extraction component by querying the datastore to determine whether the message receipt update was performed in response to the extraction component acknowledging receipt of the message; and initiate a subsequent forwarding of the message to the extraction component by obtaining necessary credentials to access the third-party messaging service, retrieving proactively the message from the third-party messaging service at least a second time, and reforwarding the message to the extraction component, in response to determining the message was not received by the extraction component.

2. The system of claim 1, wherein verifying whether the message was received by the extraction component includes:

identifying a previous verification timestamp associated with a storage container for messages included as part of a most recently performed verification;

identifying one or more storage containers for messages retrieved since the previous verification timestamp; and querying only entries of the datastore associated with the one or more storage containers to determine whether the extraction component acknowledged receipt of the message.

3. The system of claim 1, the plurality of instructions when executed further causing the one or more processors to:

set a current verification timestamp associated with the one or more storage containers in response to verifying whether the message was received by the extraction component.

4. The system of claim 1, wherein verifying whether the message was received by the extraction component includes performing the verification by one or more jobs that are part of a distributed set of computing resources.

5. The system of claim 1, wherein the verifying is performed as part of a schedule determined based on a predefined bucket size storing a set of messages.

6. A computer program product comprising a non-transitory computer-readable medium having a program code embodied therein to be executed by one or more processors, the program code including instructions to:

retrieve proactively from a third-party messaging service and by a retrieval component of the system, a message associated with a user account that is subscribed to an on-demand service;

create an entry for the message within a datastore, the datastore storing information to trace a distribution of the message within the system;

distribute the message to at least an extraction component within the system, the extraction component extracting information from the message, the extracted information being provided to a productivity tool within the on-demand system;

perform one or more updates to the entry to trace the distribution of message, the one or more updates including a message distribution update in response to distributing the message to at least the extraction component, and a message receipt update when the extraction component acknowledges receipt of the message;

verify whether the message was received by the extraction component by querying the datastore to determine whether the message receipt update was performed in response to the extraction component acknowledging receipt of the message; and initiate a subsequent forwarding of the message to the extraction component by obtaining necessary credentials to access the third-party messaging service, retrieving proactively the message from the third-party messaging service at least a second time, and reforwarding the message to the extraction component, in response to determining the message was not received by the extraction component.

7. The computer program product of claim 6, wherein verifying whether the message was received by the extraction component includes:

identifying a previous verification timestamp associated with a storage container for messages included as part of a most recently performed verification;

identifying one or more storage containers for messages retrieved since the previous verification timestamp; and querying only entries of the datastore associated with the one or more storage containers to determine whether the extraction component acknowledged receipt of the message.

8. The computer program product of claim 6, the program code including further instructions to:

set a current verification timestamp associated with the one or more storage containers in response to verifying whether the message was received by the extraction component.

9. The computer program product of claim 6, wherein verifying whether the message was received by the extraction component includes performing the verification by one or more jobs that are part of a distributed set of computing resources.

10. The computer program product of claim 6, wherein the verifying is performed as part of a schedule determined based on a predefined bucket size storing a set of messages.

11. A method comprising:

retrieving proactively from a third-party messaging service and by a retrieval component of the system, a message associated with a user account that is subscribed to an on-demand service;

creating an entry for the message within a datastore, the datastore storing information to trace a distribution of the message within the system;

distributing the message to at least an extraction component within the system, the extraction component extracting information from the message, the extracted information being provided to a productivity tool within the on-demand system;

performing one or more updates to the entry to trace the distribution of message, the one or more updates including a message distribution update in response to distributing the message to at least the extraction component, and a message receipt update when the extraction component acknowledges receipt of the message;

verifying whether the message was received by the extraction component by querying the datastore to determine whether the message receipt update was performed in response to the extraction component acknowledging receipt of the message; and initiating a subsequent forwarding of the message to the extraction component by obtaining necessary credentials to access the third-party messaging service, retrieving proactively the message from the third-party messaging service at least a second time, and reforwarding the message to the extraction component, in response to determining the message was not received by the extraction component.

12. The method of claim 11, wherein verifying whether the message was received by the extraction component includes:

identifying a previous verification timestamp associated with a storage container for messages included as part of a most recently performed verification;

identifying one or more storage containers for messages retrieved since the previous verification timestamp; and querying only entries of the datastore associated with the one or more storage containers to determine whether the extraction component acknowledged receipt of the message.

13. The method of claim 11, further comprising:

setting a current verification timestamp associated with the one or more storage containers in response to verifying whether the message was received by the extraction component.

14. The method of claim 11, wherein verifying whether the message was received by the extraction component includes performing the verification by one or more jobs that are part of a distributed set of computing resources.

15. The method of claim 11, wherein the verifying is performed as part of a schedule determined based on a predefined bucket size storing a set of messages.

* * * * *